United States Patent [19]

Chow

[11] Patent Number: 4,607,530
[45] Date of Patent: Aug. 26, 1986

[54] TEMPERATURE COMPENSATION FOR PRESSURE GAUGES

[75] Inventor: Edward Y. Chow, Danbury, Conn.

[73] Assignee: Schlumberger Technology Corporation, New York, N.Y.

[21] Appl. No.: 667,249

[22] Filed: Nov. 1, 1984

[51] Int. Cl.$^4$ .............................................. G01L 19/04
[52] U.S. Cl. ..................................... 73/708; 364/558; 364/571; 364/578
[58] Field of Search ................ 73/708, 155, 152, 151, 73/702, 4 R; 364/571, 578, 558

[56] References Cited

U.S. PATENT DOCUMENTS

| | | | |
|---|---|---|---|
| 3,561,832 | 4/1969 | Karrer et al. | 310/9.6 |
| 3,646,815 | 3/1972 | Martin et al. | 73/708 |
| 4,000,643 | 1/1977 | Pearson | 73/88.5 R |
| 4,192,005 | 3/1980 | Kurtz | 364/558 |
| 4,208,918 | 10/1980 | Miyamae | 73/708 |
| 4,226,125 | 4/1980 | Waugh | 73/708 |
| 4,320,664 | 6/1982 | Rehn et al. | 73/708 |
| 4,355,537 | 4/1982 | Vander Have | 73/708 |
| 4,366,714 | 9/1983 | Adorni | 73/708 |
| 4,414,853 | 12/1983 | Bryzek | 73/766 |
| 4,464,725 | 8/1984 | Briefer | 364/571 |
| 4,468,968 | 7/1984 | Kee | 73/708 |
| 4,490,803 | 12/1984 | Briggs | 338/3 |

OTHER PUBLICATIONS

Sinha & Tiersten, "Transient Thermally Induced Frequency Excursions in Doubly-Rotated Quartz Thickness-Mode Resonators", *Proc. 34th Ann. Frequency Control Symposium,* May 1980, pp. 393–402.

Ballato & Vig, "Static and Dynamic Frequency-Temperature Behavior of Singly and Doubly Rotated, Oven-Controlled Quartz Resonators"; *Proc. 32nd Ann. Symposium on Frequency Control,* 1978, pp. 180–188.

Athans, Michael, "The Role and Use of the Stochastic Linear–Quadratic–Gaussian Problem in Control System Design", *IEEE Transactions on Automatic Control,* vol. AC-16, No. 6, Dec. 1971, pp. 529–552.

"The Linear Quartz Thermometer—a New Tool for Measuring Absolute and Difference Temperatures", *Hewlett Packard Journal,* vol. 16, No. 7, Mar. 1965, pp. 1–7.

*Primary Examiner*—Donald O. Woodiel
*Attorney, Agent, or Firm*—David P. Gordon

[57] ABSTRACT

Methods and apparatus are provided for thermally compensating pressure determinations of pressure gauges through the use of a fast responding thermal device which is attached to the gauge and a dynamic model of the pressure gauge resonator which assumes that the temperature is not uniform throughout the resonator when temperature transients are present. The pressure gauge is subjected to known temperature and pressure conditions so that the parameters of a dynamic thermal model of the resonator may be determined, as well as a frequency and temperature to pressure mapping. The gauge may then be used to make measurements and provides a frequency output. The thermal device provides temperature readings. The temperature readings are input into a dynamic system using the dynamic thermal model to provide a correction to the frequency output of the pressure gauge such that the corrected frequency may be input into the frequency and temperature to pressure mapping to provide the thermally corrected pressure reading. Different embodiments of the invention include a single gauge in an open-loop configuration, two gauges in an open-loop configuration which is especially useful in the borehole environment, a single gauge in a closed-loop configuration, and two gauges in a dynamic system switching configuration.

33 Claims, 8 Drawing Figures

TEMPERATURE COMPENSATION FOR PRESSURE GAUGES

BACKGROUND OF THE INVENTION

The present invention relates generally to a method for thermally compensating pressure gauge determinations, and to means for providing an accurate pressure determination. More particularly, the invention relates to a method for thermally compensating quartz pressure gauge determinations through the use of a dynamic model of the thermal response of the resonator of the pressure gauge. The method provides for quick and accurate thermal compensation which is especially useful in environments such as encountered in the formation testing, oil well and borehole arts where substantial thermal gradients and/or thermal shocks, some of which are due to pressure shocks and resultant adiabatic heating or cooling, may be present.

In the pressure gauge arts, pressure gauges employing precision piezoelectric quartz resonators are known for providing highly accurate pressure determinations. For example, as disclosed in U.S. Pat. No. 3,561,832 to H. E. Kerrer et al., which is assigned to the Hewlett-Packard Company, a quartz pressure gauge may be fashioned from a single piece of crystalline quartz with the gauge comprising a hollowed cylinder and a circular resonator with electronics thereupon. The cylinder may be oriented with respect to the crystalline axis for selected characteristics. By applying a predetermined voltage to the resonator, the resonator may be caused to resonate at a resonance frequency. The application of pressure around the cylinder causes the resonator to change its oscillation frequency. By measuring the change in the oscillation frequency, the applied pressure may be accurately determined.

While the oscillation frequency of the resonator of the quartz pressure gauge is a function of the applied pressure, it is known that the frequency is also affected by temperature. Thus, in order to provide an exact measure of the applied pressure, the reading must be compensated for temperature changes. One proposed method for eliminating the temperature effect on the pressure measuring gauge was to provide an isolated second (reference) gauge which was to be kept at a constant pressure but which was to be subjected to the identical temperature fluctuations of the first gauge. Under equilibrium, when both gauges had attained thermal equilibrium at the same temperature, the difference in frequencies output by the gauges could then be directly correlated to the change in pressure seen by the first gauge.

Other devices and techniques for compensating for the temperature dependence of pressure gauges are known. Typically, the devices provide compensation circuits which are sensitive to a measured temperature and cause either the input current and voltage or the output reading to change as a function of the measured temperature. An example of such devices is U.S. Pat. No. 4,414,853 to J. Bryzek, assigned to the Foxboro Company, where the voltage supply of a pressure transducer is regulated by a circuit which responds to both the pressure determination and a feedback circuit operating in a non-linear manner for generating a control signal in response to a temperature signal. Through such a scheme, the current supplied to the pressure sensor is changed so that compensation is made for errors in pressure measurement caused by changes in temperature. Another example of temperature compensation for pressure gauges is found in U.S. Pat. No. 4,366,714 to N. Adorni, assigned to CISE S.p.A., where a compensation technique is disclosed for particular application to drill wells of great depth. The patent discloses an apparatus for pressure/temperature measuring, where a separate temperature reading of the pressure sensor temperature is used to correct the pressure sensor reading through the utilization of calibration procedures. Those skilled in the oil well and borehole arts will appreciate that accurate pressure measurements and a log of the pressure over time and/or along the depth of the borehole are advantageous. Pressure measurements are used in a wide variety of geophysical logging tools, such as, for example, the formation-sampling apparatus disclosed in U.S. Pat. No. 3,530,933 to F. Whitten, and assigned to the same assignee of this invention.

While many different techniques and devices purportedly compensate pressure determination for thermal effects, all of those techniques known to the inventor have assumed that the temperature over the entire resonator of the pressure gauge is constant (static) during measurement. Because this assumption is only true where the gauge is permitted to reach thermal equilibrium, complete compensation for thermal effects is impossible in the prior art if the environmental temperature is changing, such as in the well logging and formation testing arts where pressure pulses causing adiabatic heating are being measured. In situations where the temperature at a given point is constant but measurement is desired over a distance such that the gauge is moved through areas of differing temperatures, complete compensation is obtained by the prior art only by permitting the gauge to remain at a fixed location for a long period of time. Such time expenditure, however, is disadvantageous in many applications, and especially in the borehole and production logging arts, where thermal gradients may be large or thermal shocks prevalent.

SUMMARY OF THE INVENTION

An object of the invention, therefore, is to provide a method for the thermal compensation of a pressure gauge which accounts for the thermal dynamics of the gauge resonator.

It is a further object of the invention to provide a method for quickly and accurately providing a pressure measurement which has been thermally compensated.

It is yet a further object of the invention to provide a method for providing thermally compensated pressure measurements in a well logging environment.

Yet another object of the invention is to provide means for accomplishing the aforementioned objects of the invention.

In accordance with the objects of the invention, a pressure gauge employing a precision piezoelectric quartz resonator such as is disclosed in U.S. Pat. No. 3,561,832 to H. E. Kerrer et al., which is assigned to the Hewlett-Packard Company, is provided. The pressure gauge is arranged such that a predetermined voltage may be applied to cause the resonator to resonate, and the frequency of oscillation may be measured. A fast responding thermal device such as a platinum resistance thermal device (RTD) is attached in the immediate vicinity of the resonator for measuring the environmental temperature (i.e. the temperature of the environment immediately surrounding the resonator). The thusly arranged device is then subjected to a known set of pressure and temperature conditions so that the parameters of a dynamic thermal model of the resonator may be determined. The dynamic model accounts for the fact that the temperature over the quartz resonator of the pressure gauge is non-uniform, especially when the gauge is subjected to large thermal transients. After the parameters of the dynamic model are determined, the device is introduced into the surroundings (such as a borehole) in which the pressure is to be determined. The temperature of the gauge's immediate environment, as measured by the RTD, and the pressure of the surroundings which are transmitted to the immediate environment and measured by the pressure gauge, are then measured over time at a single location if a pressure transient is expected, or for each location for which a pressure measurement is desired. Each resulting measurement is then input into a dynamic system which includes the dynamic model of the gauge resonator and which adjusts the measured pressure for thermal effects. If desired, continuous readings may be obtained, and the adjusted pressure measurements may be provided as a log.

Because of hardware limitations which, for example, could limit the ability to transmit high frequency signals over long distances, an alternative arrangement which provides two sets of quartz pressure gauges with fast responding thermal devices is provided. Each crystal is subjected to a known set of pressure and temperature conditions for a determination of its resonator's dynamic model parameters. One of the crystals (the reference) is then kept at constant pressure while the other (the measurement crystal) is subjected to environmental pressure. By subtracting the frequency outputs of the gauges, the difference frequency, which will be of much lower frequency, can be easily produced and transmitted over distances, if desired. Because the reference gauge frequency is calculable according to the dynamic model of the reference pressure gauge resonator, and the effect of thermal transients on the measurement gauge frequency can be calculated from the dynamic model of the measurement gauge resonator, the difference of the two provides a frequency which can be used in conjunction with the measured difference frequency to provide a thermally corrected pressure via a previously determined frequency-pressure-temperature calibration.

The above-summarized embodiments are designated "open-loop" dynamic methods because no feedback of the compensated pressure is provided in calculating future pressure readings. According to the invention, however, systems utilizing feedback may be desirable, especially where it is assumed that the RTD temperature readings are affected by changes in pressure. Feedback may also be desirable where the underlying model of the resonator is a simplified one, and where noise is encountered. Thus, "closed-loop" embodiments are provided to help reduce the effects of pressure on the RTD readings, as well as the effects of model simplifications and noise. The closed-loop embodiments are so named because they require the feedback of the compensated pressure output into an estimation filter which is built into the dynamic system to help reduce the unwanted effects. Those skilled in the art will appreciate that in both the open and closed loop systems, the underlying dynamic model for the quartz resonator and the method for determining the parameters thereof are essentially identical. The closed-loop system, however includes augmented dynamics to account for simplifications in the model and noise in the measurements.

A better understanding of the invention, and additional advantages and objects of the invention will become apparent to those skilled in the art upon reference to the detailed description and the accompanying drawings.

DETAILED DESCRIPTION OF THE PREFERRED EMBODIMENTS

Figure 1:
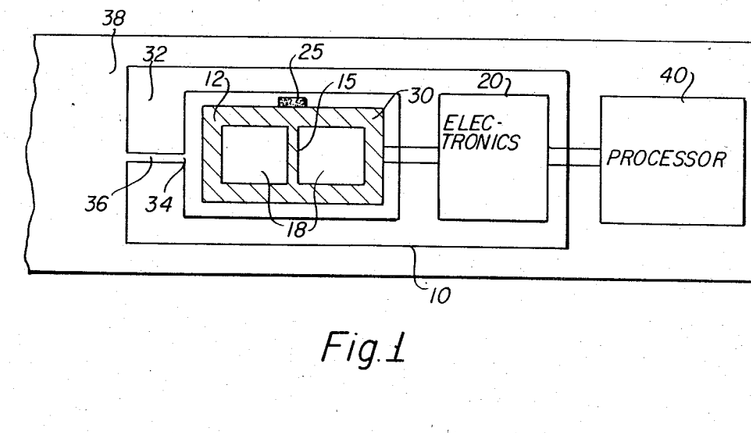
FIG. 1 is a partial schematic of the measuring devices of the apparatus invention where a quartz pressure gauge has a fast responding thermal device mounted thereon.

For purposes of definition herein, it should be understood that the term "gauge" is meant to include a complete assembly of a quartz crystal including the quartz resonator thereof, the electronics attached to the resonator, and the housing surrounding the quartz crystal. The resonator together with the electronics is also known as an oscillator. With these definitions in mind, the measuring devices of the apparatus invention are shown in FIG. 1. A highly accurate pressure gauge 10 is provided, and preferably employs a quartz crystal 12 which includes a precision piezoelectric quartz resonator 15, and electronics 20. A pressure gauge, manufactured by the Hewlett-Packard Company, Palo Alto, Calif., catalogue #2813B, is considered a standard in the art and suffices as an example of such a gauge. The crystal 12 of pressure gauge 10 is fashioned from a single piece of crystalline quartz and generally comprises an evacuated hollowed cylinder (the vacuum denoted by 18) with the resonator 15 located at approximately the center of the hollowed cylinder. As is known in the art, the cylinder may be oriented with respect to the crystalline axis for selected characteristics. In conjunction with the mechanical aspects of gauge 10, electronic means 20 are included for applying a predetermined voltage to the gauge, such that the gauge may be caused to resonate at a predetermined resonating frequency, and for providing the oscillation signal. Additional means such as a counter (not shown) are provided so that the frequency of oscillation may be measured.

According to the invention, a fast responding thermal device 25, such as a platinum resistance thermal device (RTD), is loosely attached to crystal 12 in the immediate vicinity of the resonator 15. The RTD may be placed in contact with crystal 12 by the use of a metal sleeve or the like (not shown) which permits the flow of fluid around the crystal but which holds the RTD in place. The thermal device 25 has a short thermal time constant and is used for measuring the environmental temperature, i.e., the temperature of the environment immediately adjacent the crystal near the resonator. As seen in FIG. 1, the crystal 12 may be surrounded by a liquid 30, such as silicone oil, which is in turn encompassed by the gauge housing 32. An opening 34 in the housing 32 is provided for capillary tubing 36 which connects the silicone oil 30 to the outside environment (borehole) 38. In this manner, the pressure of the surroundings in question 38 (e.g. the borehole or well) will be transferred by the oil 30 to the gauge 10 so that the pressure will be distributed equally over gauge crystal 12.

The apparatus invention also includes a processor 40, which may or may not include a frequency counter which must be provided, for taking the pressure (frequency) output of the gauge 10 and thermal output of thermal device 25, processing the outputs according to a dynamic model of the thermal response of the apparatus, and providing either an adjusted pressure reading or an adjusted frequency response which may be correlated to the true pressure reading. The processor 40 may be located near or far from gauge 10, and may comprise dedicated hardware or a properly programmed computer, as desired. If pressure measurements are taken over a distance, as in the context of well logging, the determination of the true pressure may be plotted graphically as a log over the borehole depth. If pressure measurements are taken over time at a given location, such as in the context of applying pressure pulses to an earth formation and measuring the received signals, the true pressure may be plotted graphically as a log over time.

As aforementioned, in order to provide a proper pressure determination with gauge 10, the oscillator output must be compensated for the thermal effects of its own environment. The actual temperature of the resonator or crystal environment alone, however, does not provide enough information from which to compensate the pressure gauge reading. Therefore, information concerning the dynamic reaction of the crystal resonator to the temperature changes of the crystal or resonator environment is also required.

The dynamic model of the resonator of the pressure gauge relies on the underlying physics of the apparatus. The frequency output of the resonator is determined by the stress distribution of the crystal. During thermal transient conditions, the non-uniform temperature profile established inside the crystal causes a deviation from the equilibrium stress distribution. This in turn gives rise to a shift in the frequency that is associated with the thermal transient response of the measure gauge. Therefore, in order to compensate for the transient effect, a dynamic model that describes how the temperature profile evolves as the environmental temperature (silicone oil temperature) changes, and the relationship between the instantaneous temperature profile and the frequency output is required.

In order to provide a model which could be utilized for the real-time correction of the frequency measurement, various assumptions concerning the measurement gauge were made. The crystal of the pressure gauge was modelled as a homogeneous, isotropic, infinite cylinder with radius R, and with boundary conditions requiring that the heat flow at the surface of the quartz crystal be continuous, and that the temperature derivative at the center of the crystal be zero. Furthermore, the temperature in the surrounding of the crystal is assumed to be uniform. Those skilled in the art will appreciate that different assumptions can be provided depending on the accuracy and complexity of solutions desired.

With the assumptions outlined above, the frequency change of the gauge as a function of time y(t) can be considered as a function of the change in pressure and a function of the radial temperature distribution inside the cylinder T(r,t), as will be more fully set forth below The radial temperature distribution may be determined through an equation describing the thermal diffusion inside the cylinder:

$$\frac{c\partial}{\partial t} T(r,t) = -\nabla \cdot [-\sigma \nabla T(r,t)] \quad (1)$$

where c is the thermal capacitance of the crystal (quartz), $\sigma$ is the thermal conductivity of the crystal, $\nabla$ indicates a gradient, and $\nabla \cdot$ is a divergence. For a physical understanding of the equation, the right hand-most term is also known as the heat flow "J" with the divergence being the change in heat flow J (which causes a change in the temperature of an arbitrary volume inside a crystal if the heat flowing into this volume does not equal the heat flowing out) Thus, equation (1) is a conservation of energy equation which may be rewritten as $$\frac{c\partial}{\partial t} T(r,t) = -\nabla \cdot J.$$

The above-mentioned boundary conditions provide helpful equations for solving equation (1) for the radial temperature distribution. Because the crystal is modelled as a homogeneous, isotropic cylinder, with axial symmetry, the derivative of the temperature distribution at the center of the crystal is zero:

$$\frac{\partial}{\partial r} T(r,t)|_{r=0} = 0 \quad (2)$$

Also, the fact that heat coming into the crystal must come from the surroundings explains the continuous heat flow at the surface boundary requirement which yields:

$$\sigma \frac{\partial}{\partial r} T(r,t)|_{r=R} + h[T(R,t) - T_e(t)] = 0 \quad (3)$$

where h is the heat transfer coefficient of the temperature of the immediate environment $T_e(t)$ to the temperature at the surface of the crystal $T(R,t)$. Equations (2) and (3) together with a determination of the environmental temperature $T_e$ and the initial conditions $T(r,t=0)$, permits the solution of equation (1) for $T(r,t)$.

In determining the frequency change of the crystal as a function of time, a finite difference approximation which divides the cylinder into N concentric rings of equal mass is preferably used together with boundary conditions (2) and (3) to permit equation (1) to be recast in the form of the state equation:

$$\frac{d}{dt} x(t) = A\, x(t) + b\, T_e(t) \quad (4)$$

where A is a N×N matrix, x and b are N-vectors, and the ith element of $x(t)$, $x_i(t)$ is the temperature of the ith ring with the first ring being in the center of the cylinder and the Nth ring being the outermost ring. Equation (4), in turn, can be solved by a differencing scheme in the time variable.

The frequency ouput of the resonator has the form:

$$y(t) = F(T_m(t), P(t)) + \Delta f(t) \quad (5a)$$

$$\Delta f(t) = \sum_{i=1}^{M} \sum_{j=1}^{N} w_j^i (T_m(t))(\tilde{x}_j(t))^i \quad (5b)$$

where $T_m(t)$ is the mean temperature of the crystal, $\tilde{x}_j(t)$ is the deviation of the jth ring from the mean temperature, $w_j^i$ are weights for the ith power of the jth ring which are dependent on the temperature, the elastic properties of the crystal, the thermal expansion coefficients of quartz, the eigenmode of the quartz resonator, etc., and $F(T_m,P)$ is the equilibrium frequency-temperature-pressure characteristic of the crystal gauge. In essence, equation (5) simply states that the frequency output of the gauge at any given time is a function of the applied pressure, the mean temperature of the crystal resonator, and the deviations at different points in the resonator to that mean temperature at the same instant in time. Another manner of explaining equation (5) would be to say that the output frequency of the device equals the frequency output of a device which is not affected by thermal transient effects (the first term), plus a frequency correction, $\Delta f$, (the second term) which is a result of those thermal transient effects.

In defining the parameters of equation (5), the mean temperature, $T_m(t)$, is defined as the average of the temperature of all the N rings:

$$T_m(t) = (1/N) \sum_{j=1}^{N} x_j(t) \quad (6)$$

while the deviation of each ring from the mean temperature, $\tilde{x}_j(t)$ is defined as:

$$\tilde{x}_j(t) = x_j(t) - T_m(t) \quad (7)$$

With all of the equations above, it is necessary to make a determination of the parameters. Thus, c, $\sigma$, h, the numerous $w_j^i$, $F(T_m,P)$, N, M, and $T_m(t=0)$ must be determined. The number of parameters may be decreased by one by combining c, $\sigma$, and h into two parameters: $\sigma/c$ and $h/c$.

To determine $F(T_m,P)$, the apparatus is permitted to equilibrate until the entire gauge is at one temperature; i.e. $x_j = 0$ for all j. In this state, equation (5) reduces to $y = F(T_m,P)$. By conducting static measurements where the pressure and temperature are varied, and the frequency y is measured, $F(T_m, P)$ may be determined. Similarly, pressure may be determined as a function of temperature and frequency, i.e. $P = F^{-1}(T_m,y)$ for $\tilde{x}_j = 0$ for all j.

$T_m(t=0)$ and $x(t=0)$ are determined for each use of the sensor. The apparatus is permitted to equilibrate in its environment and $T_m(t=0) = x_j(t=0)$ for all j becomes $T_e$.

M of equation (5) is the maximum power of the power series used in calculating $\Delta f$. For simplicity, M may be chosen as 1. If the temperature deviations from ring to ring within the crystal are expected to be large, a higher M may be chosen.

N is the number of rings into which the crystal is divided. N may be chosen as 10 such that a fair model of the crystal which permits of a temperature gradient is provided, while the calculations required for solving equations (4) and (5) are kept from being too large.

Figure 2:
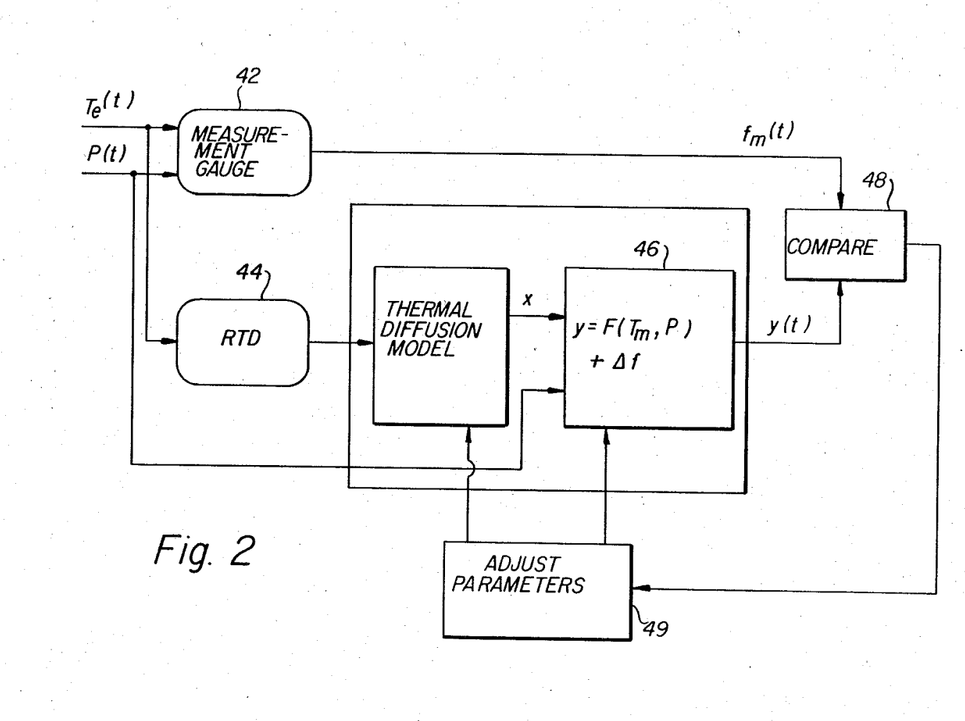
FIG. 2 is a block diagram of a method of determining the parameters of a dynamic model of the measurement gauge resonator.

The remainder of the parameters, $\sigma/c$, $h/c$, and the weights $w_j^i$, are determined from experimental data analysis By knowing all of the parameters, an output frequency, y(t), can be predicted for given pressures and environmental temperatures. The apparatus is subjected to an experiment where, as shown in FIG. 2, the measurement crystal is subjected, at 42, to a known pressure P(t), and temperature $T_e(t)$, and, in response, outputs a frequency response $f_M(t)$ which is also measured. Conceptually, both $f_M$ and y denote the measure gauge frequency. They are different from each other in that $f_M$ is the actual measured measure crystal frequency and y is the frequency predicted by the model. The environmental temperature $T_e(t)$, is measured by the RTD thermal device at 44. The goal, then, is to provide a dynamic model having optimal parameters which, according to the output equation (5), will produce the same frequency response with the same inputs as the gauge itself. In other words, for the same input, y(t) should closely approximate $f_M(t)$.

In light of the goal, the measured temperature is input at 45 into state equation (4) which comprises part of the dynamic model for the resonator. With some of the dynamic model parameters chosen or determined as suggested above, sets of values for the remaining parameters are tested for how close to the measured frequency $f_M(t)$, the frequency y(t) predicted at 46 from output equation (5) comes. The results due to each value set are thus compared at 48 to the measured frequency response, and a least squares analysis may be conducted to determine the optimal set of parameter values. To decrease the amount of calculation and analysis required in choosing the optimal set of parameters, computer programs such as ZXMIN, available through International Mathematical and Statistical Libraries Inc., 7500 Bellaire Boulevard, Houston, Tex., may be utilized at 49 to adjust the parameter values so as to direct one skilled in the art towards the optimal values.

With all the parameters of the dynamic model being determined for a given apparatus in this manner, a dynamic model which relies on equations (4)–(5) may be said to take the measured environmental temperature and provide a thermal profile of the resonator, which in turn provides a frequency correction to the measured frequency. Rewriting equation (5a) so that the pressure is being determined, rather than the frequency:

$$P(t) = F^{-1}(T_m(t), y(t) - \Delta f(t)) \qquad (8)$$

it is seen that through this inverse function, the true thermally compensated pressure may be accurately determined. As with the dynamic model, the inverse function may also be embodied in a processor 40 or the like.

Figure 3:
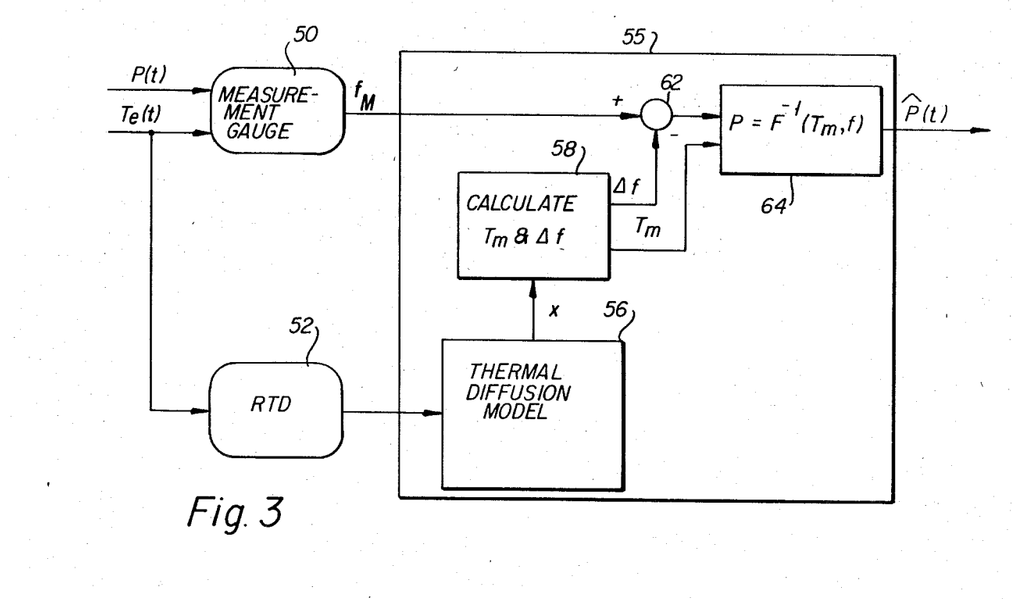
FIG. 3 is a block diagram of the method invention for the thermal compensation of a measurement gauge where the dynamic model of the gauge resonator is used in an open-loop arrangement.

Turning to FIG. 3, the method invention for thermally compensating pressure measurements is shown. An apparatus having a gauge and fast response thermal device are initially subjected to known temperature and pressure conditions so as to provide parameters for the dynamic model used in correcting the frequency output of the gauge. The crystal and resonator are permitted to equilibrate so that the mean temperature at time 0, $T_m(t=0)$, and x(t) are set to the temperature $T_e$ of the silicone oil in the housing, which initially would equal the temperature of the environment in which the gauge has remained for a period of time. The apparatus is then operative with measurement gauge 10 providing a frequency output, $f_M(t)$, at 50 which is a function of pressure and temperature, and fast response thermal device 25 providing a temperature determination of the silicone oil environment, $T_e(t)$, at 52. The apparatus is now ready to be placed in the surrounding environment, such as the borehole, in which the pressure determination is desired. The temperature of the silicone oil environment as seen by the RTD changes according to the temperature in the borehole and other thermal effects such as adiabatic heating or cooling caused by pressure pulses. The environmental temperature is then fed into the a dynamic system 55 which comprises at least the dynamic model (56 and 58), and preferably a frequency substractor 62, and means 64 for perfoming the inverse function required to take the corrected frequency and provide the true pressure When the environmental temperature is fed into the dynamic system 55, a determination of the temperature of the respective resonator rings $x_j(t)$ is accomplished at 56, as the diffusion model equation (4) is solved through the use of the determined $T_e$. The temperature deviations $x_j(t)$ are then determined from $\bar{x}_j(t)$ at 58 and are used in output equation (5b) to determine the frequency correction $\Delta f$.

The frequency correction is used to correct the frequency output of the measuring gauge which was measured at 50, through frequency subtraction at 62. In this manner, the corrected frequency, $f_M(t) - \Delta f(t)$, is the frequency which the gauge would have output had it not been affected by the transient thermal effects. The corrected frequency is then input at 64 into means for performing an inverse function according to equation (8) so as to provide a true and thermally corrected pressure determination, $\bar{P}(t)$. A typical example of such an inverse function is shown in Chart I.

If desired, continuous pressure and temperature measurements may be taken. Thus, as shown in FIG. 3, the inputs to and outputs from the boxes of the flow diagram are functions of time. In the oil well and borehole arts, the determined values for the thermally corrected pressure measurements may then be placed in log format. Thus, if formation testing is being accomplished, as for example, in accord with U.S. Pat. No. 3,530,933 to F. Whitten, a plurality of pressure measurements may be taken over time at a single location. If other borehole tools are utilized which are moved along the borehole, the derived pressure determinations in time may be translated from time into a log of pressure according to borehole depth.

The method of FIG. 2 was followed for determining dynamic model parameters for an apparatus utilizing an RTD and a quartz pressure gauge. The apparatus was placed in an oil bath and permitted to equilibrate. The pressure and temperature were systematically changed and the resulting frequency change was measured to provide the static or equilibrium frequency-temperature characteristic $F(T_m, P)$ of the crystal gauge, as shown in Chart II.

Figure 4:
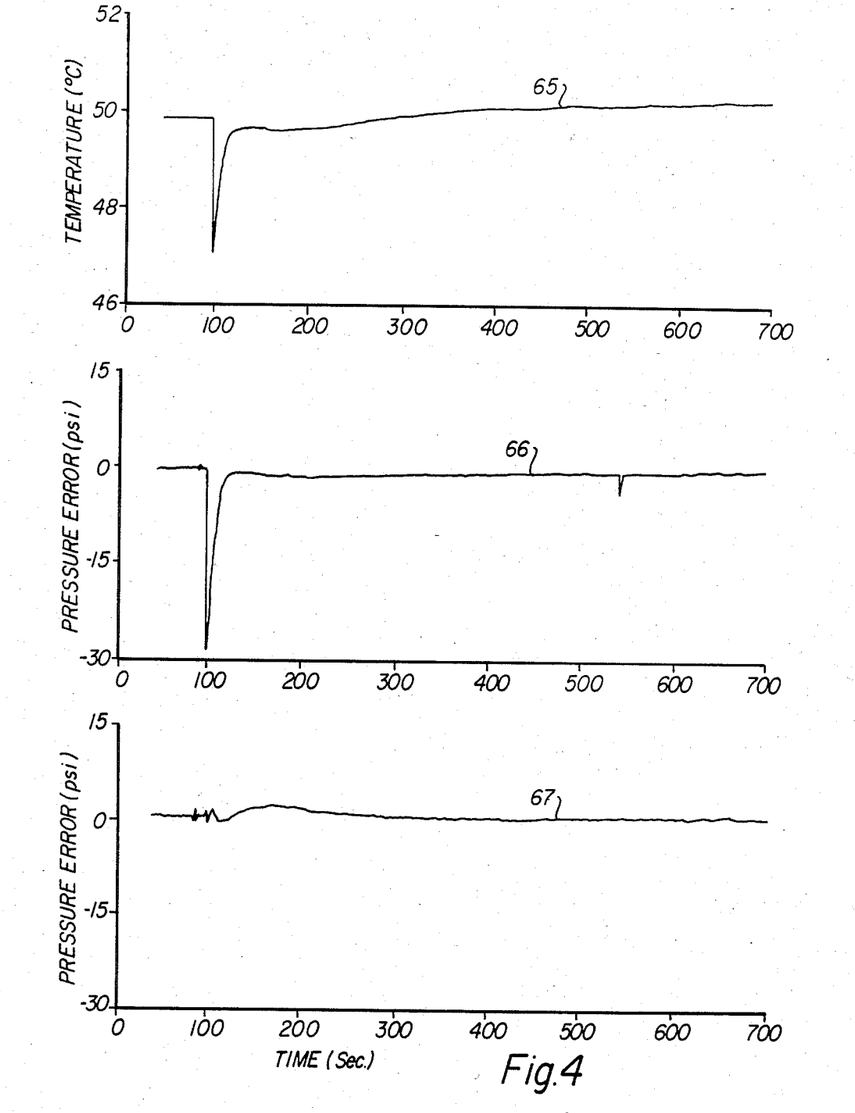
FIG. 4 is a graph showing a thermal shock to the gauge which was used for determining the optimal parameters of the dynamic model, and showing the pressure error in the prior art system due to the shock as compared to the error resulting from the use of the dynamic model with the determined optimal parameters.

The entire apparatus was allowed to equilibrate at 10 kpsi and 49.85° C., i.e. $x_j(t=0) = T_e = 49.85°$ C. for all j. M was chosen as 1 and N was chosen to be 10. The pressure was then reduced instantaneously to that of the atmosphere which resulted in the adiabatic cooling of the silicone oil. The temperature of the silicone oil, which was measured by an RTD and which is shown as line 65 of FIG. 4, showed a sharp decrease to 47° C. followed by a slower return to approximately 50° C. The rapid change in temperature caused an error in the pressure determination provided by a prior art system as indicated by line 66.

In order to determine a set of parameter values that would provide a predicted frequency output which was close to the actual output of the gauge, a least squares analysis, which incorporated equations (4) and (5) and made use of ZXMIN, was applied to the experimental data; e.g. the applied pressure, the RTD temperature, and the measurement gauge frequency output. An appropriate set of parameter values as shown in Chart III was obtained. Using these values, the error in the predicted frequency output when translated into pressure error is shown as line 67, which may be directly and favorably compared with line 66.

Those skilled in the art will appreciate, of course, that other techniques could have been utilized to determine an "optimal" set of parameters. Moreover, even with identical original sets of values, different results could be obtained by continuing to propose additional sets of values, or by deviating from the suggestions of ZXMIN.

Figure 5:
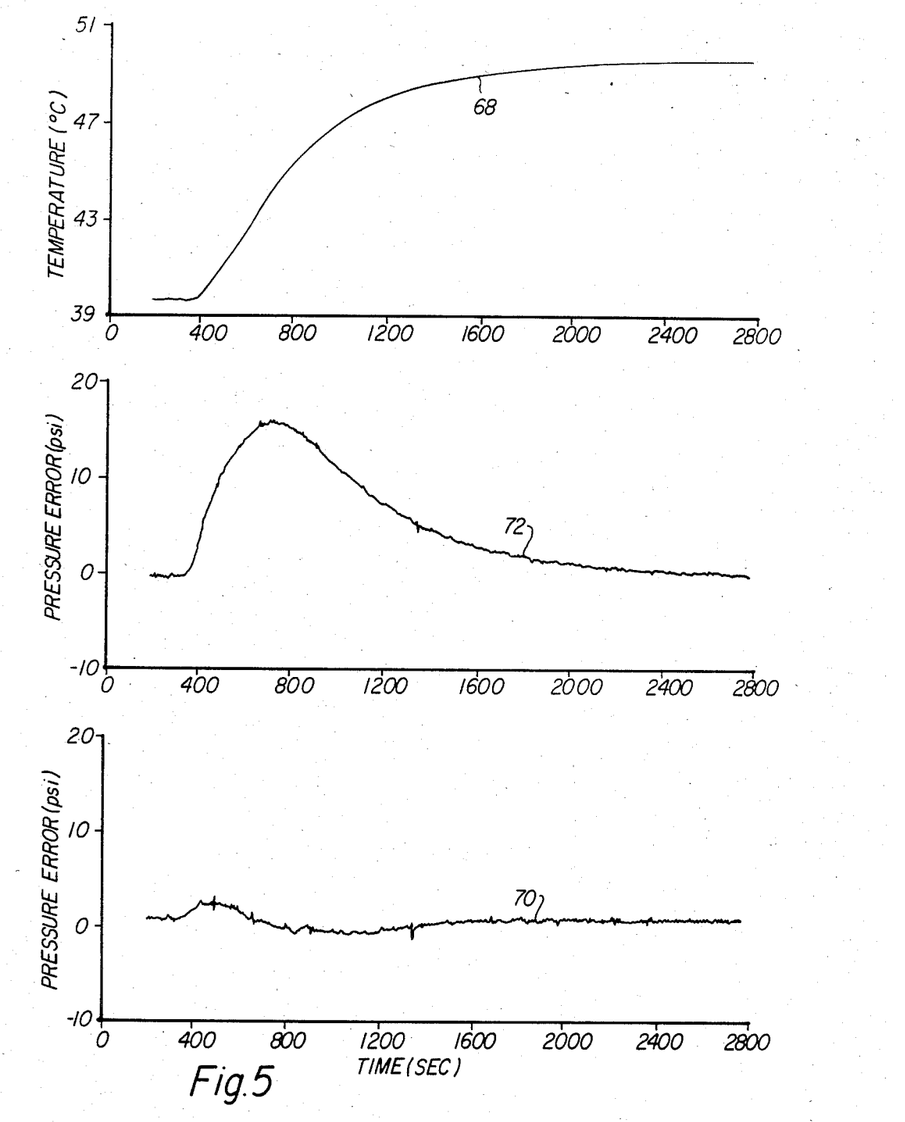
FIG. 5 is a graph showing a thermal shock to the gauge other than the shock used to determine the parameters of the dynamic model of the resonator, and the pressure error using the dynamic compensation method invention as compared to the pressure error of a prior art system.

With values chosen for the parameters as set forth in Chart III, the method invention was tested by placing the apparatus in an oil bath at 39.69° C. The system was permitted to equilibrate, and $x_j(t=0)$ was set at 39.69° C. The apparatus was then subject to a thermal shock by heating the oil bath by ten degrees Centigrade over thirty minutes, as seen by line 68 of FIG. 5. The frequency output of the gauge and the environmental temperature were measured for approximately one hour. The results were then input into the dynamic model containing the previously determined parameter values. The pressure error as a function of time after single gauge, open-loop, dynamic compensation is recorded as line 70 on FIG. 5 and shows that within approximately four and one-half minutes, the pressure error was reduced to less than 1 psi. The pressure error after compensation with a prior art system utilizing two sets of crystals without a RTD and without the dynamic model, is shown as line 72 on FIG. 5. As is readily seen, the pressure error of the prior art system remained greater than 1 psi for approximately thirty minutes. It is also of note in comparing the error of the invention to that of the prior art, that the error in psi was almost negligible (3 psi at peak) for the system using the dynamic model, while the psi error for the prior art system (16 psi at peak) was a factor of five greater. Moreover, the error of the dynamic model system had reduced to less than 1 psi before the error of the prior art system had even peaked.

Figure 6:
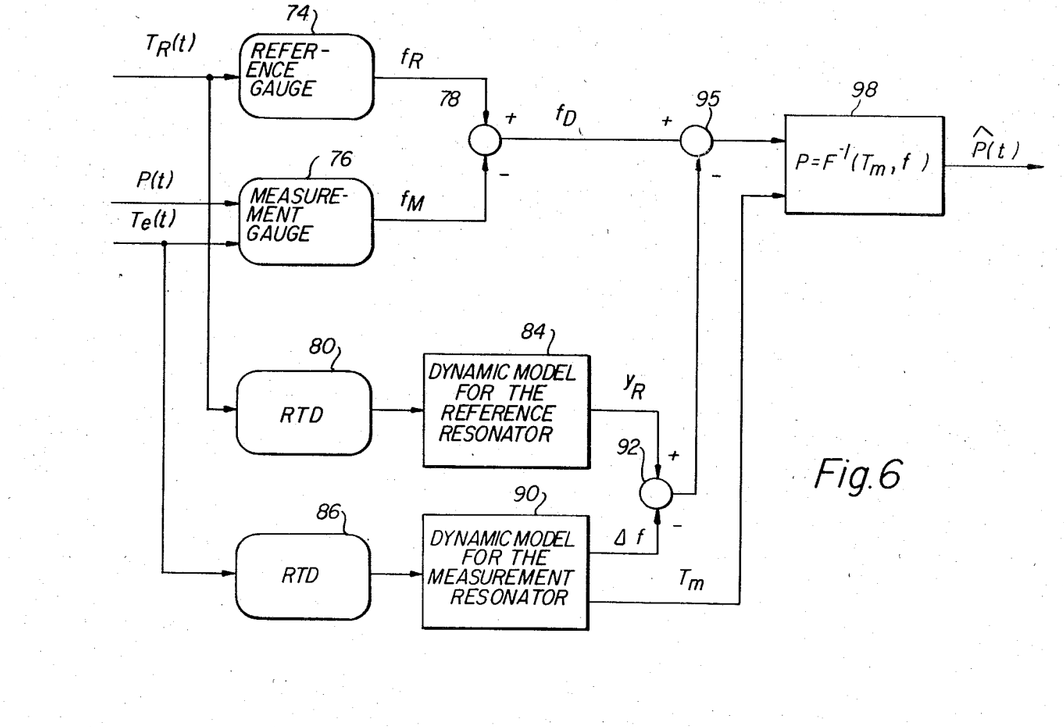
FIG. 6 is a block diagram of an alternative embodiment of the method invention of FIG. 2, where two sets of quartz pressure gauges having fast responding thermal devices are used together with their own dynamic models in an open-loop arrangement.

Turning to FIG. 6, an alternative embodiment of the open loop invention is seen. According to the FIG. 6 embodiment, two gauges, with an RTD mounted on the crystal of each, are subjected to parameter determination for their resonators according to the method set forth above. The crystal of one of the gauges is then designated the "measurement crystal" while the other is designated as the "reference crystal". The measurement crystal is subjected to the borehole pressure through the tubing and silicone oil surrounding the gauge, and the environmental temperature of the measurement crystal is also measured. The reference crystal, however, is pressure isolated such that the pressure is constant, and only its environmental temperature is permitted to change.

The two gauge open loop embodiment is useful because of the high frequencies (e.g. 5 MHz) involved with quartz pressure sensors. Often, because of the hostile environment associated with boreholes, it is very difficult to make accurate measurements of such high frequencies and the changes therein. By providing two gauges, the difference in frequencies (which is typically on the order of 10 KHz) may be more accurately measured. Moreover, lower frequencies can be more easily transmitted over distances, which, in the borehole and well logging contexts, is often a necessity. With this in mind, the invention provides for the difference in frequencies to be utilized as set forth below.

At 74, the reference crystal oscillating voltage characterized by frequency $f_R$, (which is a function of the temperature only, as the pressure is kept constant) is provided. At 76, the measurement crystal oscillating voltage characterized by frequency $f_M$, which changes as a function of the environmental temperature and pressure, is provided. An oscillation signal which is characterized by $f_D$, the difference of the two frequencies, is provided at 78 through the use of a mixer according to $f_D = f_R - f_M$, and is easily transmitted over long distances.

At 80, the temperature is measured at the reference crystal by the reference crystal RTD. The temperature is input into the dynamic model for the reference crystal which provides at 84 a frequency prediction $y_R$, for the reference crystal. At 86, the temperature of the reference crystal is measured by the measurement crystal RTD. The determined temperature is input into the dynamic model for the measurement crystal which provides at 90 a frequency correction, $\Delta f$, for the measurement crystal. At 92, the difference between $y_R$ and $\Delta f$ is taken to provide a frequency which at 95 effectively cancels the reference gauge frequency and provides a correction for the measurement gauge frequency. The corrected frequency output at 95 is input at 98 into a frequency and temperature to pressure map, or inverse function. Because the difference frequency can be modelled as $f_D = y_R - F(T_m, P) - \Delta f$, as is readily seen by equation (5a), and $f_D$, $\Delta f$, and F are all known, it is seen that the corrected pressure determination, $\hat{P}(t)$, may be readily solved via the inverse function $F^{-1}$ as described above.

While the open-loop embodiments discussed above are extremely helpful in providing temperature compensated pressure readings for quartz pressure gauges which have a relatively small error which is reduced to acceptable limits in a relatively short time frame, additional accuracy and speed may sometimes be gained through the use of a closed-loop system which recognizes that the underlying model of the resonator is a simplified one, and that noise is extant. Thus, for example, because it is believed that many resistance thermal devices are pressure sensitive, one closed-loop embodiment does not assume that the RTD measured temperature is the true temperature. Moreover, because noise is often involved in pressure measurements, the closed-loop system provides a filter which will account for and correct for the same. Those skilled in the arts should recognize, however, that the closed-loop embodiments only provide improved results in certain circumstances. Thus, when the noise involved is small, the open-loop embodiments may be preferable as they are simpler and are not dependent on additional models of pressure and temperature behavior which are not precisely known, but which are used in the augmented dynamics of the closed-loop system.

Figure 7:
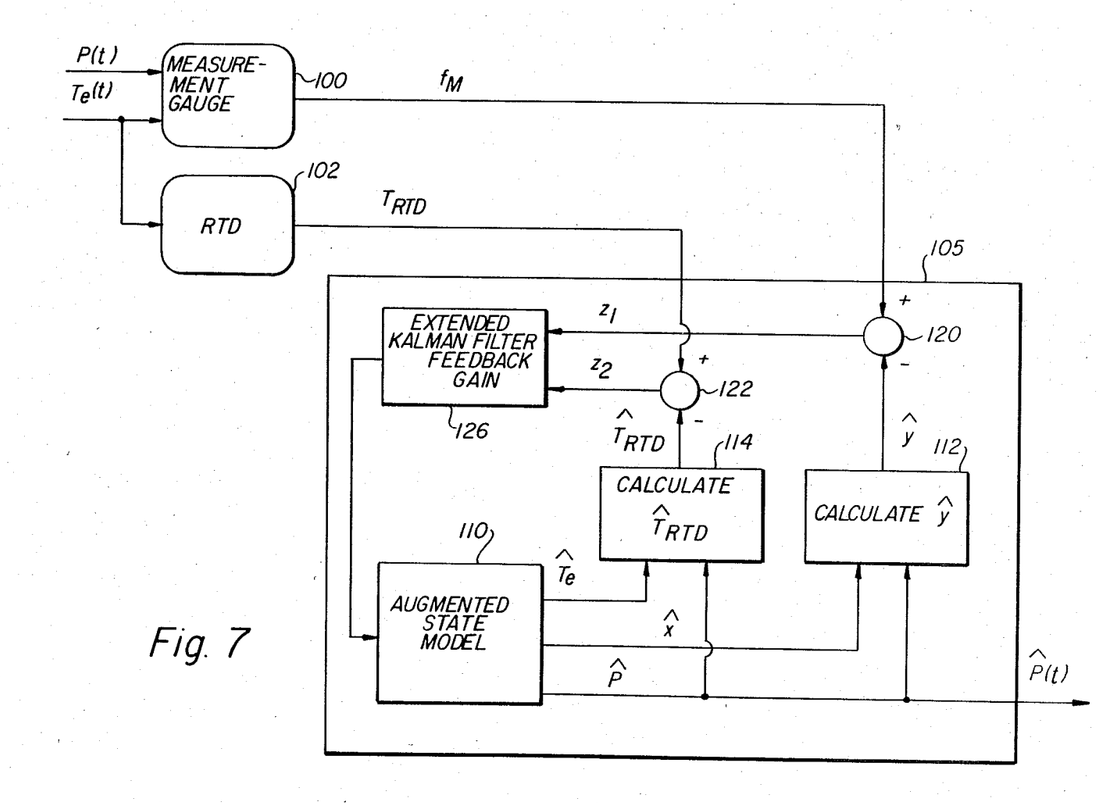
FIG. 7 is a block diagram of the method invention where the dynamic model of the measurement gauge is in a closed-loop arrangement.

In providing a closed-loop system as seen in FIG. 7, the open-loop process of finding parameters for the system is utilized. Thus, $\sigma/c$, $h/c$, the numerous $w_j^i$, $F(T_m, P)$, N and M, are all determined by subjecting the gauge to "testing". However, once the parameters are determined, it is not assumed that the pressure measured by the gauge exactly equals the pressure of the surroundings, or that the temperature measured by the RTD exactly equals the temperature of the environment surrounding the crystal. Instead, a state equation and an output equation are designed so that an extended Kalman filter may be provided to filter the measurements and provide an improved determination. Thus, the state equation is:

$$\frac{d}{dt}\begin{bmatrix} x \\ T_e \\ P \end{bmatrix} = \begin{bmatrix} A & b & 0 \\ 0 & c & f \\ 0 & d & e \end{bmatrix} \begin{bmatrix} x \\ T_e \\ P \end{bmatrix} + \begin{bmatrix} \{_1 \\ \{_2 \\ \{_3 \end{bmatrix} \quad (9)$$

where x is a vector describing the temperature of the discretized rings of the measurement resonator, $T_e$ is the environmental temperature scalar, P is the pressure scalar, A and b are derived from equation (4), and c, d, e, and f, and the covariances of the noise terms, $\{_1$, $\{_2$, and $\{_3$ and are variables chosen according to the results and the found parameters as previously set forth. In essence, relationship (9) states that the change in the determined temperature in the rings of the gauge is a function of the temperature of the rings, the environmental temperature, and noise; the change in the measured environmental temperature is a function of the environmental temperature, the pressure, and noise; and the change in pressure is a function of the environmental temperature, the pressure, and noise The "noises" here are sometimes known as "fictitious noise" and are typically taken as zero-mean white Gaussian noises characterized by a covariance matrix U. They may be interpreted as being introduced due to uncertainties or inaccuracies in the state equation.

That the change in determined temperature of the discretized rings of the gauge is a function of the form $Ax + bT_e$ may be seen by discretizing equations (1)–(3).

That the change in environmental temperature includes a pressure term is due to the possibility of adiabatic heating. Thus, if no adiabatic heating is expected, f may be set to 0. If the RTD is not pressure sensitive, the differential equation for $T_e$ may be eliminated, and $T_e$ may be directly measured. That the change in pressure includes an environmental temperature term is due to the fact that if a fixed volume of liquid is heated, the pressure exerted by the liquid increases. However, where the volume is not fixed such as in the described apparatus where the tubing connects the immediate environment to the borehole surroundings, the environmental temperature term d may be set to 0.

The output equation required for setting up the Kalman filter is as follows:

$$\begin{bmatrix} y \\ T_{RTD} \end{bmatrix} = \begin{bmatrix} F(T_m, P) + \Delta f \\ G(T_e, P) \end{bmatrix} + \begin{bmatrix} \eta_1 \\ \eta_2 \end{bmatrix} \quad (10)$$

where G is a function, and $\eta_1$ and $\eta_2$ are zero-mean white Gaussian measurement noises with covariance matrix V. The first relationship set forth in (10) is exactly that of output equation (5) above. The second relationship includes a term G which is defined as a function which describes the relationship of the RTD output to the true temperature and pressure and which is determined by a series of controlled calibration experiments. In the event that the RTD is pressure insensitive, $T_{RTD}$ is just a noisy measurement of $T_e$.

Given the state and the output equations (9) and (10), an extended Kalman filter is constructed according to principles well known in the Kalman filter arts. The filter has the following form:

$$\frac{d}{dt} \begin{bmatrix} \hat{x}(t) \\ \hat{T}_e(t) \\ \hat{P}(t) \end{bmatrix} = \begin{bmatrix} A & b & 0 \\ 0 & c & d \\ 0 & e & f \end{bmatrix} \begin{bmatrix} \hat{x}(t) \\ \hat{T}_e(t) \\ \hat{P}(t) \end{bmatrix} + Kz(t) \quad (11)$$

where $$\begin{bmatrix} z_1(t) \\ z_2(t) \end{bmatrix} = \begin{bmatrix} f_M(t) - \hat{y}(t) \\ T_{RTD}(t) - \hat{T}_{RTD}(t) \end{bmatrix} \quad (12)$$

$$\hat{y}(t) = \hat{F}(\hat{T}_m(t), \hat{P}(t)) + \sum_{j=1}^{N} \sum_{i=1}^{M} w_j^i \tilde{x}_j(t); \quad (13)$$

$$\hat{T}_{RTD}(t) = G(\hat{T}_e(t), \hat{P}(t)); \quad (14)$$

$$\hat{T}_m(t) = 1/N \sum_{j=1}^{N} \hat{x}_j(t); \text{ and} \quad (15)$$

$$\tilde{x}_j(t) = \hat{x}_j(t) - \hat{T}_m(t). \quad (16)$$

With A, b, F, G, and the $w_j^i$'s determined as described above, the gain matrix K is a function of the variables c, d, e, and f, and the noise covariance matrices U and V. These variables and the covariance matrices are chosen according to the results that the filter provides when utilized. (For a detailed discussion of Kalman filters, see A, Gelb, ed., *Applied Optimal Estimation*, The M.I.T. Press, Cambridge, Mass., 1974.) Once the filter is constructed, the frequency output of the gauge ($f_M(t)$), and the temperature reading of the RTD ($T_{RTD}(t)$) are input into the filter which incorporates the dynamic model, which in turn provides an estimate $\hat{x}(t)$ of x(t), an estimate of the true environmental temperature $\hat{T}_e(t)$, and an estimate of the temperature compensated pressure $\hat{P}(t)$.

Returning to FIG. 7, the temperature and pressure seen by the measurement crystal over time are the inputs for the measurement gauge which outputs a frequency at 100. The temperature input is also measured by the RTD at 102 which provides $T_{RTD}$, the RTD temperature, which is no longer assumed to be the true environmental temperature. As will be discussed below, the temperature and frequency are input into the dynamic system 105 which includes augmented dynamic model 110, 112, and 114, means 120 and 122 for comparing frequency and temperature determinations, and feedback gain means 126.

In the embodiment of FIG. 7, the augmented model, which includes the dynamic model of the pressure gauge, must be given initial values such that it can output at 110 its three estimates (determinations), $\hat{x}(t)$, $\hat{P}(t)$, and $\hat{T}_e(t)$. By letting the pressure gauge equilibrate in an environment of constant temperature and pressure, $\hat{P}(t=0)$ may be assigned the pressure reading determined by the static compensation method, and $\hat{T}_e(t=0)$ and each component of $\hat{x}(t=0)$ may be assigned the reading of the RTD which is loosely attached to the measurement crystal. The resonator ring temperature vector $\hat{x}(t)$, and the pressure determination P(t) are then used at 112 to provide the augmented dynamic model frequency response, $\hat{y}(t)$, according to equation (13). Likewise, the pressure determination and the environmental temperature determination of the augmented dynamic model are used to provide the RTD temperature in accordance with equation (14). The augmented dynamic model frequency response and the RTD temperature determinations are then compared at 120 and 122 respectively to the measured values of 100 and 102 which are input into dynamic system 105. The differences are fed back at 126 with a gain which is determined by using established extended Kalman filter design methods and which is a function of the parameters of the entire system (A, b, c, . . . , M, N, weights $w_j^i$, etc.) so that the estimates $\hat{x}(t)$, $\hat{P}(t)$ and $\hat{T}_e(t)$ for the next time determination may be properly computed.

The addition of a second pressure gauge to the above-described closed-loop system provides the same advantages over the above-described single gauge closed-loop system that the two gauge open-loop system provides over the single gauge open-loop system. Those skilled in the art will understand how to accomplish the same from the previous disclosure by recognizing that equation (9) may be augmented with the dynamic model for the reference resonator, and that the expression for y(t) in equation (10) may be replaced with the expression for $y_D(t)$, the modelled difference frequency.

Further improvements to the system are recognized permitting the system to switch from a closed-loop dynamic compensation embodiment to an open-loop dynamic compensation embodiment to even a static compensation scheme of the prior art under certain circumstances. Thus, when the pressure or temperature in the borehole does not change much (i.e. an almost static surroundings are being measured), the quartz crystal arrangement of the prior art may be more accurate than the provided arrangements of the invention because of the inaccuracies of the RTD and the simplifications in the dynamic model. The embodiment provided in FIG. 8 accounts for the need to switch embodiments depending upon the circumstances. It thus permits the system to revert to a simple quartz crystal measurement system when a determination is made that the surroundings are nearly static, thus avoiding the model simplifications and RTD inaccuracies. When the surroundings resume with temperature and/or pressure gradients beyond a predetermined level, the embodiment of FIG. 8 switches back to a pressure determination made by the single gauge open-loop dynamic model embodiment or the closed-loop embodiment utilizing the RTD and the dynamic model within the Kalman filter. Those skilled in the art will recognize that, in accord with these teachings, if desired, a double gauge open-loop or closed-loop embodiment could be used when the switch back to the open-loop or closed-loop embodiment is made.

Figure 8:
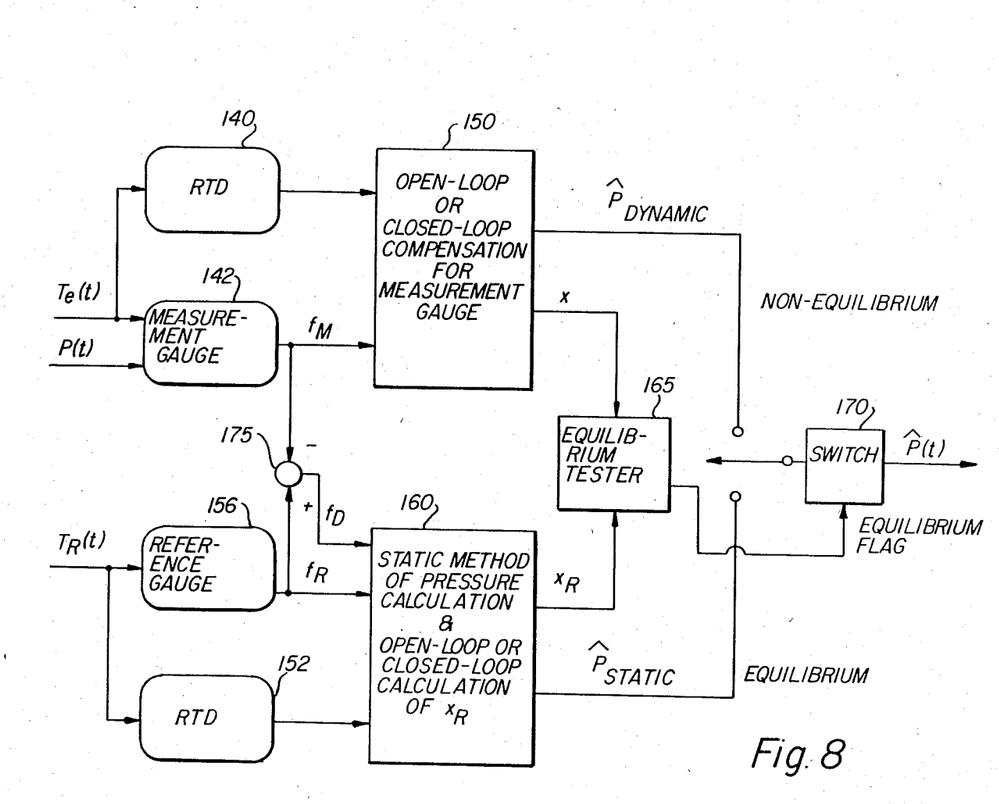
FIG. 8 is a block diagram of an alternative embodiment of the method invention where two sets of quartz pressure gauges having fast responding thermal devices are used together with their own dynamic models in an arrangement which permits switching between dynamic and static compensation.

In FIG. 8, the pressure and the environmental temperature are measured by at 140 and 142 respectively by the measurement crystal and the RTD attached thereto. Thus, the measurement gauge frequency and the RTD output temperature are input into the single gauge open-loop or closed-loop compensation embodiment at 150 which outputs both pressure (P(t)) and radial temperature (x(t)) determinations.

The temperature seen by the reference crystal and RTD attached thereto is measured by the reference RTD at 152 and generally differs from the temperature seen by the measurement crystal. The reference crystal is maintained at a constant pressure, and thus only the temperature change affects the reference crystal pressure output at 156. The temperature and pressure outputs from 152 and 156 are input into a dynamic model of the reference crystal at 160, so that two determinations may be made. First, a calculation of the radial temperature distribution in the reference crystal ($x_R(t)$) is made via the open-loop and/or closed-loop method of the particular dynamic mode utilized. The results of the radial temperature distribution of the reference crystal as well as the radial temperature distribution of the measurement crystal determined at 150 are input into an equilibrium tester at 165. When a predetermined level of uniformity for both crystals is found (set at a point where it is believed that the RTD and dynamic model introduce more error than they correct), the tester instructs a switch at 170 to switch out of the dynamic model mode. When the predetermined level of uniformity is not met, the tester instructs the switch to continue or to again start utilizing the dynamic model mode, such that the open-loop or closed-loop pressure determination of 150 is designated as the true and final temperature-compensated pressure.

The second determination made at 160 takes the difference frequency which is obtained via mixing the oscillation signals 142 and 156 of the measurement and reference pressure gauges, and together with the reference crystal temperature determination from 152, provides a static compensation of the pressure determination for temperature as is known in the prior art. When the switch is instructed at 170 to switch out of the dynamic model mode due to the uniformity of temperature over the resonators, the static compensation results are used as the true and final temperature-compensated pressure determination, $\hat{P}(t)$.

There has been described and illustrated herein, methods and systems in accordance with the present invention for thermally compensating a pressure determinations of a pressure gauge by using a dynamic model of the resonator of the pressure gauge. While particular embodiments of the invention have been described, it is not intended that the invention be limited thereby, as it is intended that the invention be broad in scope and that the specifications be read likewise. Thus, those skilled in the art will recognize that various aspects of the different described embodiments may be combined in a plurality of ways to arrive at desired results. For example, the use of more than one gauge, the use of an open-loop and/or closed-loop system, the switching between different systems, etc., may be combined in different fashions according to the particular situation or needs of the user. Moreover, the choice of parameter values, and even the parameters themselves may be changed according to particular needs, theories, or system realities. Further, the exact nature of the loop may be changed within the scope of the invention, such that, for example, other filtering, estimation, or feedback techniques may be substituted in place of Kalman filtering in the closed-loop embodiments. Even further, and in a broad sense, the particular hypotheses which determined the exact shape of the dynamic model can be changed and the results would still be within the teachings of the invention, provided, of course, that a dynamic model of the gauge resonator is utilized.

Those skilled in the art should also recognize that various aspects of the prior art can be favorably combined with the teachings of the invention. Thus, where the measured surroundings are static, thereby causing the environment of the gauge and the gauge itself to equilibrate, the invention provides for using prior art measurement concepts if those concepts are more accurate than the dynamic model teachings of the invention. For additional accuracy, those skilled in the art should appreciate that it might be preferable for the dynamic model of each gauge used in accordance with the teachings of this invention to contain different values for the determined parameters depending upon what temperature ranges are expected to be encountered. For instance, a different value for a parameter may be assigned for every ten (or other) degree temperature range such that the mean gauge temperature as determined via the dynamic model may dictate which predetermined parameter value should be used. Alternatively, the parameters determined for different temperature ranges may be fitted to temperature so that parameter values may vary continuously with temperature.

Further, those skilled in the art should understand that while the invention was described in terms of "measuring a pressure", for purposes of the invention, the pressure measurement, the oscillating voltage which results therefrom, and the frequency which characterizes the oscillating voltage should be considered one and the same. Moreover, the term "resonator" should be understood to encompass pressure sensing elements of gauges. Likewise, while the invention was described in terms of a "dynamic system", it will be recognized that the system may be chosen to be more or less inclusive of some of the elements (such as frequency subtractions, or inverse functions) involved.

Finally, those skilled in the art should recognize that while the invention was described with particular reference to a standard quartz pressure gauge known in the art, the invention also applies to any other pressure gauge (e.g. surface acoustic wave ("SAW") devices) or pressure measuring device where temperature compensation is desirable. Therefore, it will be apparent to those skilled in the art that other changes and modifications may be made to the invention as described in the specification without departing from the spirit and scope of the invention as so claimed.

Chart I
Static Temperature and Frequency To Pressure Map $P = F^{-1}(T_m, f)$ $= \sum_{i=0}^{4} \sum_{j=0}^{3} b_{ij}(.01\ T_m)^i (1000\ f)^j$ where $T_m$ is temperature in degrees Centigrade, P is pressure in pounds per square inch (psi), and $f = \dfrac{(\text{frequency} - 5 \times 10^6)\text{Hz}}{5 \times 10^6\ \text{Hz}}$

| $b_{ij}$ | j = 3 | j = 2 | j = 1 | j = 0 |
|---|---|---|---|---|
| i = 4 | −.2308998E + 01 | −.2828057E + 02 | −.1170395E + 03 | −.2026325E + 03 |
| i = 3 | 0.6059503E + 01 | 0.7537400E + 02 | 0.3119469E + 03 | 0.1979546E + 03 |
| i = 2 | −.5336688E + 01 | −.6854857E + 02 | −.2904124E + 03 | −.1392202E + 04 |
| i = 1 | 0.1767358E + 01 | 0.2327425E + 02 | 0.1026835E + 03 | 0.1816278E + 04 |
| i = 0 | −.4200721E + 00 | 0.2133694E + 02 | −.3367418E + 04 | −.6056885E + 04 |

Chart II
Static Temperature and Pressure To Frequency Map $y = F(T_m, P)$ $= \sum_{i=0}^{4} \sum_{j=0}^{3} a_{ij}(.01\ T_m)^i (.001\ P)^j$ where $T_m$ is temperature in degrees Centigrade, P is pressure in pounds per square inch (psi), and $y = \dfrac{(\text{frequency} - 5 \times 10^6)\text{Hz}}{5 \times 10^6\ \text{Hz}}$

| $a_{ij}$ | j = 3 | j = 2 | j = 1 | j = 0 |
|---|---|---|---|---|
| i = 4 | 0.2566808E − 07 | −.5211227E − 06 | 0.3461801E − 05 | −.1519525E − 04 |
| i = 3 | −.7431206E − 07 | 0.1509930E − 05 | −.9260384E − 05 | −.5781685E − 04 |
| i = 2 | 0.7298959E − 07 | −.1510748E − 05 | 0.1109800E − 04 | −.2981468E − 03 |
| i = 1 | −.2706092E − 07 | 0.5639127E − 06 | −.5676632E − 05 | 0.4902678E − 03 |
| i = 0 | 0.2046629E − 08 | 0.5525721E − 06 | −.2901984E − 03 | −.1777622E − 02 |

Chart III
Parameters of the Dynamic Model

| R | 0.1250000E + 01 |
|---|---|
| $\sigma/c$ | 0.2087994E − 01 |
| $h/c$ | 0.2766897E + 00 |
| $w_1^1$ | −.3828307E − 05 |
| $w_2^1$ | −.1409581E − 05 |
| $w_3^1$ | −.1052273E − 06 |
| $w_4^1$ | 0.2343543E − 06 |
| $w_5^1$ | 0.5148295E − 06 |
| $w_6^1$ | 0.6363223E − 06 |
| $w_7^1$ | 0.5609376E − 06 |
| $w_8^1$ | 0.3746287E − 06 |
| $w_9^1$ | −.2068344E − 04 |
| $w_{10}^1$ | 0.1619945E − 04 |

What is claimed is:

1. A method for thermal compensation of the pressure determination of a pressure gauge, comprising:
   (a) measuring the pressure of the surroundings of which a pressure determination is desired with said pressure gauge;
   (b) measuring the temperature of the immediate environment of a resonator of said pressure gauge;
   (c) inputting said temperature measurement and said pressure measurement into a dynamic system, wherein said dynamic system comprises a dynamic model of said resonator; and
   (d) from said dynamic system, providing a thermally compensated pressure determination.

2. A method according to claim 1, wherein:
   step (d) comprises, determining an adjustment for said pressure measurement from said dynamic system, and adjusting said pressure measurement measured by said gauge with said determined adjustment to provide an adjusted pressure measurement.

3. A method according to claim 2, wherein:
   said adjusted pressure measurement is represented by a frequency; and
   step (d) further comprises, determining the mean temperature of said resonator, and inputting said mean temperature and said frequency into an inverse function relating said mean temperature, said frequency, and pressure, to provide a thermally compensated pressure determination.

4. A method according to claim 3, wherein:
   said measuring the temperature step is accomplished with a fast responding thermal device; and
   said measuring the pressure step is accomplished with a quartz pressure gauge.

5. A method according to claim 1, wherein:
   said dynamic model is comprised of at least one state equation and at least one output equation.

6. A method according to claim 5, wherein:

said state equation describes the evolution of the thermal profile inside said resonator.

7. A method according to claim 6, wherein:
step (d) comprises, determining an adjustment for said pressure measurement from said dynamic system, and adjusting said pressure measurement measured by said gauge with said determined adjustment, and wherein
said output equation relates the thermal profile of said resonator to said adjustment for said pressure measurement.

8. A method according to claim 1, wherein a second pressure gauge which is kept at a constant pressure but is subjected to the temperature changes of said surroundings is utilized, further comprising:
(e) measuring the temperature of the immediate environment of the resonator of said second pressure gauge;
(f) inputting the temperature measurement of said second pressure gauge resonator environment into a dynamic system which includes a dynamic model of the resonator of said second pressure gauge; and
(g) from said dynamic model of the resonator of said second pressure gauge, determining a predicted pressure measurement of said second pressure gauge;
wherein, from said predicted pressure measurement of said second pressure gauge and said constant pressure, step (d) is accomplished.

9. A method according to claim 8, wherein:
step (d) comprises, determining an adjustment for said pressure measurement from said dynamic system, taking the difference of said measurement gauge pressure determination and said constant pressure of said second gauge, taking the difference of said determined adjustment for said pressure measurement and said predicted pressure measurement of said second pressure gauge, and taking the difference of said differences to provide an adjusted pressure measurement.

10. A method according to claim 9, wherein:
said adjusted pressure measurement is represented by a frequency; and
step (d) further comprises, determining the mean temperature of the resonator of said measurement gauge, and inputting said mean temperature and said frequency into an inverse function relating said mean temperature, said frequency, and pressure, to provide a thermally compensated pressure determination.

11. A method according to claim 10 wherein said surroundings of which a thermally compensated pressure determination is desired is a borehole, further comprising:
(i) repeating steps (a) through (g) over a period of time; and
(j) recording said determined thermally compensated pressure determinations over time.

12. A method according to claim 1, wherein said dynamic model of said dynamic system is augmented and provides a pressure estimate, further comprising:
(e) comparing said pressure estimate with the pressure measured by said gauge; and
(f) feeding said comparison of said pressure estimate with said pressure measured by said guage back to said dynamic model with a gain in accordance with a filter based on said dynamic model.

13. A method according to claim 12, wherein said dynamic model of said dynamic system is augmented and provides a temperature estimate, further comprising:
(g) comparing said temperature estimate made by said dynamic system to said temperature measured in step (b), and feeding the difference back to said dynamic model with said gain.

14. A method according to claim 12, further comprising:
(g) determining parameters of said dynamic model.

15. A method according to claim 14, wherein said dynamic model is comprised of a state equation and an output equation, further comprising:
(h) determining values for said parameters by, prior to measuring the temperature and pressure in accordance with steps (a) and (b),
subjecting said gauge to known pressure and temperature conditions to obtain test results and
determining optimal parameters for said state and output equations from said test results.

16. A method according to claim 1, wherein a second pressure gauge which is kept at a constant pressure but is subjected to the temperature changes of said surroundings is utilized, and wherein said dynamic model of said dynamic system is augmented and provides a pressure estimate, further comprising:
(e) measuring the temperature of the immediate environment of the resonator of said second pressure gauge;
(f) inputting the temperature measurement of said second pressure gauge resonator into said dynamic system which further comprises an augmented dynamic model of the resonator of said second pressure gauge which provides a second pressure estimate;
(g) measuring the pressure of the surroundings of said second pressure gauge;
(h) taking the difference of the pressure measurements of said pressure gauge and said second pressure gauge and comparing the difference to the difference between said pressure estimate and said second pressure estimate; wherein
said dynamic system further comprises feedback with gain from the comparison of said differences to said augmented dynamic models, the gain of said feedback being in accordance with a filter based on said dynamic models.

17. A method according to claim 16, wherein each dynamic model of said dynamic system is augmented to provide a temperature estimate, further comprising:
(h) comparing said temperature estimates to said temperatures measured in steps (b) and (e), and feeding the differences back to said dynamic model with said gain.

18. A method for the thermal compensation of the pressure determination of a pressure gauge, comprising:
(a) determining values for parameters of a dynamic model of the resonator of said pressure gauge;
(b) measuring the pressure of the surroundings of which a pressure determination is desired with said pressure gauge;
(c) measuring the temperature of the immediate environment of a resonator of said pressure gauge;
(d) inputting said temperature measurement and said pressure measurement into said dynamic system, wherein said dynamic system includes at least a dynamic model of said resonator; and (e) from said dynamic system, determining an adjustment for said pressure measurement.

19. A method according to claim 18, further comprising:
(f) adjusting said pressure measurement with said determined adjustment to arrive at a thermally compensated pressure determination.

20. A method according to claim 19, wherein:
said measuring the temperature step is accomplished with a fast responding thermal device; and
said measuring the pressure step is accomplished with a quartz pressure gauge.

21. A method according to claim 18, wherein:
said determined values for the parameters of said dynamic model are determined for specific temperature ranges such that different values are determined for different temperature ranges.

22. A method according to claim 18 wherein:
said dynamic model is comprised of a state equation which describes the thermal diffusion inside said resonator, and an output equation which relates the evolution of said thermal profile of said resonator to said adjustment required to compensate said pressure determination of said pressure gauge.

23. A method for the thermal compensation of the pressure determination of a pressure gauge according to claim 18 wherein a second pressure gauge which is kept at a constant pressure but is subjected to the temperature changes of said surroundings is utilized, further comprising:
(f) determining values for parameters of a dynamic model of the resonator of said second pressure gauge;
(g) measuring the temperature of the immediate environment of a resonator of said second pressure gauge;
(h) measuring the pressure of the surroundings of said second pressure gauge;
(i) inputting the temperature measurement of said second pressure gauge resonator into a dynamic system which includes a dynamic model of the resonator of said second pressure gauge;
(j) from said dynamic model of the resonator of said second pressure gauge, determining a predicted pressure measurement of said second pressure gauge; and
(k) determining a thermally compensated pressure determination from said pressure measurements of said pressure gauge and said second pressure gauge, said predicted pressure measurement of said second pressure gauge, and from said determined adjustment for said pressure gauge.

24. A method according to claim 23, wherein:
step (j) is accomplished by determining the mean temperature of said pressure gauge from said dynamic system, taking the difference of said pressure measurement of said second pressure gauge and said pressure measurement of said pressure gauge, taking the difference of the determined adjustment for said pressure gauge and said predicted pressure measurement of said second pressure gauge, taking the frequency difference of said differences, and inputting said frequency difference into an inverse function which relates said frequency difference, said mean temperature, and pressure, to provide a thermally compensated pressure determination.

25. A method according to claim 23 wherein said surroundings of which a pressure determination is desired is a borehole, further comprising:

(k) repeating steps (b) through (e) and steps (g) through (j) over a period of time; and
(l) recording said determined thermally compensated pressure determination over time.

26. A method for the thermal compensation of the pressure determination of a pressure gauge comprising:
(a) measuring the pressure of the surroundings of which a pressure determination is desired with said pressure gauge;
(b) measuring the temperature of the immediate environment of a resonator of said pressure gauge; and
(c) converting said pressure measurement, by means of a filter based on a dynamic model of said resonator, into a thermally compensated determination of pressure.

27. A method according to claim 26, further comprising:
(d) converting said temperature measurement, by means of said filter, into a corrected temperature estimate.

28. A method according to claim 26, further comprising:
(d) determining parameters of said dynamic model.

29. A method according to claim 28, wherein:
said dynamic model is comprised of a state equation and an output equation; and
said parameters are determined by subjecting said gauge to known pressure and temperature conditions and by determining optimal parameters for said state and output equations from the results of said subjection prior to measuring the temperature and pressure in accordance with steps (a) and (b).

30. A system for providing thermally compensated pressure measurements, comprising:
(a) a pressure gauge including a resonator for measuring pressure;
(b) a fast responding thermal device loosely attached to said gauge in proximity to said resonator, for measuring the environmental temperature in proximity to said resonator;
(c) processing means for taking the temperature measurement of said thermal device and said pressure measurement and processing said measurements according to a dynamic system which comprises a dynamic model of said resonator to provide a thermally compensated pressure determination.

31. A system according to claim 30, wherein:
said pressure gauge is a quartz pressure gauge; and
said fast responding thermal device is a platinum resistance thermal device.

32. A system according to claim 30, wherein:
said processing means includes a filter based on a model of the resonator of said pressure gauge.

33. A system according to claim 30, further comprising:
(d) a second pressure gauge including a resonator which is kept at approximately constant pressure but is subject to temperature changes caused by said surroundings, wherein said second pressure gauge provides pressure indications; and
(e) a second fast responding thermal device attached to said second pressure gauge in proximity to the resonator of said second gauge, wherein said second fast responding thermal device provides temperature indications, and wherein
said processing means further utilizes the temperature and pressure indications of said second pressure gauge and second fast responding thermal device in providing said thermally compensated pressure determination.

* * * * *